US005107160A

United States Patent [19]

Langdon

[11] Patent Number: 5,107,160

[45] Date of Patent: Apr. 21, 1992

[54] ELECTRICAL COMMUTATOR WITH REINFORCED CONNECTORS

[75] Inventor: Dale Langdon, Owosso, Mich.

[73] Assignee: Toledo Commutator Co., Owosso, Mich.

[21] Appl. No.: 495,472

[22] Filed: Mar. 19, 1990

[51] Int. Cl.[5] .......... H02K 13/04

[52] U.S. Cl. .......... 310/233; 310/234; 29/597

[58] Field of Search .......... 29/597; 310/42, 233, 310/234, 235, 43

[56] References Cited

U.S. PATENT DOCUMENTS

| | | | |
|---|---|---|---|
| 1,813,333 | 7/1931 | Wilson | 310/235 |
| 2,602,988 | 7/1952 | Klym | 310/235 |

FOREIGN PATENT DOCUMENTS

| | | | |
|---|---|---|---|
| 63-80736 | 4/1988 | Japan | 310/233 |

*Primary Examiner*—Steven L. Stephan
*Assistant Examiner*—D. L. Rebsch
*Attorney, Agent, or Firm*—Gifford, Groh, Sprinkle, Patmore and Anderson

[57] ABSTRACT

An electrical commutator of the type which is formed by bending a strip of conducting material having outwardly extending and spaced apart tangs along one side into a cylindrical sleeve so that the tangs extend outwardly from one axial end of the sleeve. The strip includes at least one, and preferably two, recessed portions in the space between adjacent tangs so that these recessed portions protrude radially inwardly once the strip is formed into the cylindrical sleeve. Anchoring portions on the inner surface of the sleeve, as well as the recessed portions, are then encapsulated in an insulating material, such as phenolic resin. Thereafter, axially extending and circumferentially spaced slots are machined in the outer periphery of the sleeve and these slots extend to a midpoint in the space between adjacent tangs. The machined slots thus separate the conductive strip into circumferentially adjacent commutator segments and the tangs are thereafter bent back to form a connection point for the coil windings of the motor. In practice, the recessed portions of the sleeve between adjacent tangs, together with their encapsulation in the insulating material, serve to reinforce the tangs against outward deflection during rotation of the commutator.

4 Claims, 1 Drawing Sheet

ELECTRICAL COMMUTATOR WITH REINFORCED CONNECTORS

BACKGROUND OF THE INVENTION

1. Field of the Invention

The present invention relates to an electrical commutator for electric motors and the like.

2. Description of the Prior Art

Electrical commutators of the type used in electric motors and the like typically comprise a plurality of commutator segments which are arranged to form a tubular cylindrical sleeve. These commutator segments are constructed of an electrically conductive material, usually copper, and which are separated from each other by an electrical insulating material. This electrical insulating material can comprise an air space, mica, phenolic resin as well as other substances.

In order to connect the commutator to the electrical windings for the motor, a winding tang is provided at one end of each commutator segment. These winding tangs typically extend radially outwardly from the commutator segments and are bent backward over the commutator sleeve so that a portion of each tang overlies the commutator sleeve.

There are two commonly used methods for constructing commutators. In one method, a plurality of individual commutator segments are positioned within the interior of a cylindrical mold. Each commutator segment typically includes an anchoring portion which protrudes radially inwardly from the commutator segment while insulating means, such as a mica layer, may also be positioned between adjacent commutator segments. Thereafter, the anchoring portions of the commutator segments are encapsulated with an electrical insulating material which, upon setting, secures the commutator segments together.

In a second and less expensive type of commutator, as shown in FIG. 1, the commutator is formed by bending a strip 10 of conductive material into a cylindrical sleeve. The strip 10 of conductive material includes a plurality of spaced apart tangs 14 which protrude outwardly from one side of the strip. Consequently, once the sleeve is formed, the tangs 14 protrude outwardly from one axial end of the sleeve. Anchoring portions extend inwardly from the interior of the sleeve and these anchoring portions are encapsulated with a moldable insulating material 16 which, upon setting, secures the anchoring portions together.

Thereafter, an axially extending slot 20 is machined in the commutator between each adjacent pair of winding tangs 14 so that the slots 20 extend entirely through the conductive strip 10. In doing so, the slots 20 form a plurality of commutator segments 22 which are electrically insulated from each other by the encapsulating material 16 as well as the air space which is formed by the slot 20. Furthermore, as shown in FIG. 1, the slot 20 extends into the space 24 between adjacent tangs 14 but terminates short of the edge of the encapsulating material 16 thus forming a fluid dam 26. This dam 26 prevents the trickle resin used to adhere the electrical commutator wires together from entering into the slot 20. Otherwise, these slots 20 would have to be undercut or remachined to remove such resin.

A primary disadvantage of the previously known shell-type commutators is that the wiring tangs 14 are unsupported by anchoring portions encapsulated in the molding material 26. Consequently, under high speed rotation of the commutator, the wiring tangs 14 tend to deflect which can damage not only the commutator, but also the electrical windings for the motor.

SUMMARY OF THE PRESENT INVENTION

The present invention provides a shell-type commutator which overcomes all of the above mentioned disadvantages of the previously known devices.

In brief, the commutator of the present invention is constructed by bending a strip of conductive material, typically copper, into a cylindrical sleeve. The conductive strip includes a plurality of spaced apart tangs protruding outwardly from one side of the strip so that, when the strip is bent into a cylindrical sleeve, the tangs protrude outwardly from one axial end of the sleeve.

The strip also includes at least one, and preferably two, recessed portions in the space between two adjacent tangs. Once the strip is bent into a tubular sleeve, these recessed portions are spaced radially inwardly from the outer periphery of the commutator.

Thereafter, the inner surface of the sleeve is encapsulated with an insulating and settable material, such as phenolic resin. This material encapsulates not only anchoring portions protruding inwardly from the strip, but also the recessed portions in the space between adjacent winding tangs.

Thereafter, axially extending and circumferentially spaced slots are machined in the outer periphery of the commutator sleeve so that the slots extend from a midpoint in the space between adjacent tangs to the opposite axial end of the sleeve. These slots are of a depth sufficient so that the slots extend entirely through the conductive material thereby forming a plurality of circumferentially spaced commutator segments which are electrically insulated from each other.

In practice, since the recessed portions of the sleeve in the space between adjacent tangs are encapsulated in the molding material, these recessed portions together with the encapsulating molding material rigidifies the tangs against deflection during high speed rotation of the commutator. This not only protects the commutator against damage, but also damage to the motor windings caused by deflection of the winding tangs.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 2:
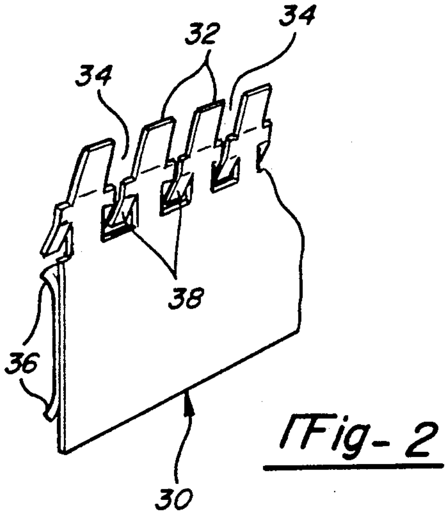
FIG. 2 is a perspective view illustrating a portion of the commutator during an initial step of construction.
Figure 1:
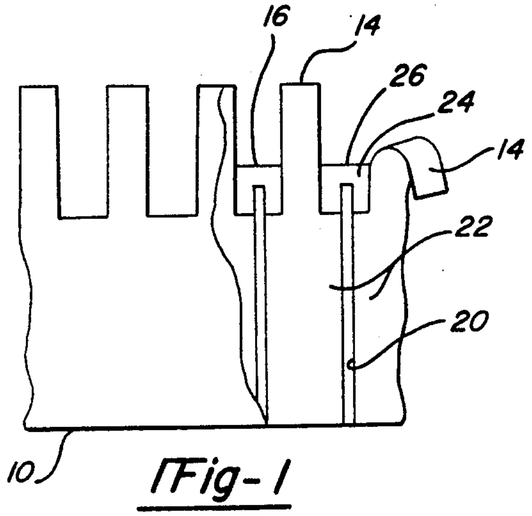
Fig-1 PRIOR ART
FIG. 1 is a view illustrating a prior art commutator.

With reference first to FIG. 2, the commutator of the present invention is first formed from an elongated strip 30 constructed of an electrically conductive material, such as copper. The strip 30 includes a plurality of winding tangs 32 extending outwardly from one side of the strip 30 so that a space 34 is formed between each adjacent 36 pair of winding tangs 32. A plurality of anchoring portions are provided on one side of the strip 30.

Figure 4:
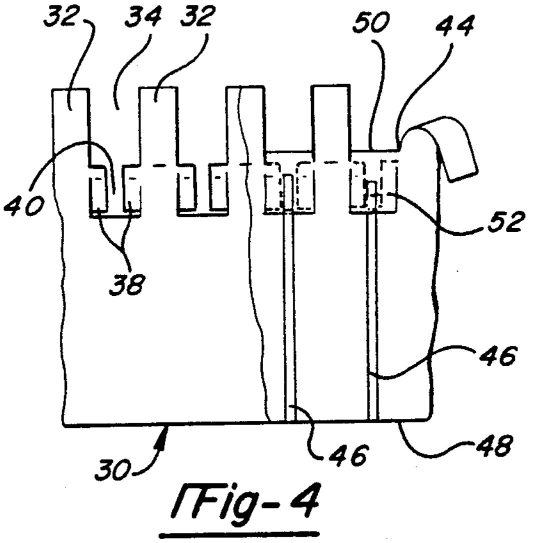
FIG. 4 is a fragmentary view illustrating a portion of the preferred embodiment of the present invention at a still further manufacturing step.

With reference now to FIGS. 2 and 4, at least one, and preferably two, recessed portions 38 are provided in the space 34 between adjacent tangs 32. These recessed portions 38 are recessed in the same direction as the anchoring portions 36 (FIG. 2) from the surface of the strip 30. Furthermore, as best shown in FIG. 4, the recessed portions 38 are spaced apart from each other as shown at 40.

Figure 3:
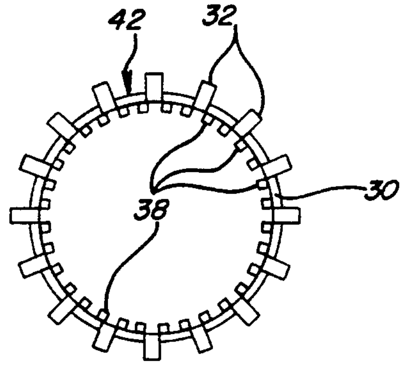
FIG. 3 is an axial end view of the preferred embodiment of the invention and illustrating a further step in the manufacture of the commutator.

With reference now to FIG. 3, the strip 30 is bent into a tubular cylindrical sleeve 42 so that the tangs 32 protrude outwardly from one axial end of the sleeve 30. Furthermore, with the strip 30 bent into the sleeve 42, the recessed portions 38 protrude radially inwardly from the outer surface of the sleeve 30.

Figure 5:
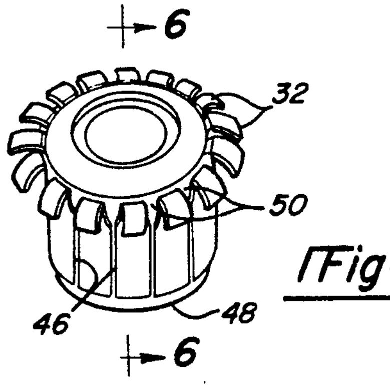
FIG. 5 is an elevational view of a finished commutator illustrating the preferred embodiment of the present invention.
Figure 6:
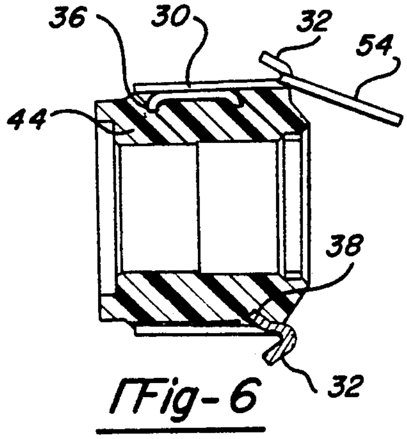
FIG. 6 is a sectional view taken substantially along line 6—6 in FIG. 5.

With reference now to FIGS. 5 and 6, the inner periphery of the sleeve 30 is then molded with a flowable settable material 44 which is also an electrical insulator. Any conventional material 40 can be used, such as phenolic resin, epoxy, melamine or polyester, which becomes rigid upon setting. Furthermore, as best shown in FIG. 6, once the moldable material 44 has set, it encapsulates not only the anchoring portions 36 of the strip 30, but also the recessed portions 38 (only one shown) in the space 34 between adjacent winding tangs 30.

With reference now to FIGS. 4 and 5, after the molding material 44 has set, an axially extending slot 46 is machined between each pair of tangs 32. As best shown in FIG. 4, each slot 46 extends from a midportion in the space 40 between the recessed portions 38 to the opposite axial end 48 of the sleeve 42. Since the slot 46 does not extend completely axially along the commutator, the molding material 44 forms a dam 50 at the end 52 of each slot 46. This dam 50 prevents the trickling resin typically used to adhere the commutator wires together from entering into the slots 46. Otherwise, it would be necessary to undercut or again machine the slots 46 in order to remove the resin.

As best shown in FIG. 6, the wiring tangs 32 are conventionally bent back over the finished commutator. The commutator wires 54 are then wound around the tangs 32 in the normal fashion.

The recessed portions 38, together with their encapsulation in the molding material 44 as shown in FIG. 6, serves to rigidify and reinforce the winding tangs 32 against deflection during high speed rotation of the commutator. This is in sharp contrast to the previously known commutators which do not include the recessed portions 38. With these other previously known commutators without the recessed portions 38, the inertia of the wiring tangs 32 at high speed rotation of the commutator causes the wiring tangs 32 to deflect and move relative to each other as well as to the main body of the commutator. This in turn produced stress not only on the commutator, but also the commutator wires. Damage to the motor brushes, the motor windings and/or the commutator, oftentimes resulted.

Having described my invention, many modifications thereto will become apparent to those skilled in the art to which it pertains without deviation from the spirit of the invention as defined by the scope of the appended claims.

I claim:

1. In an electrical commutator of the type which is constructed by bending a strip of conductive material having outwardly extending and spaced apart tangs along one side into a cylindrical sleeve having two axial ends, said tangs extending outwardly from one axial end of said sleeve, encapsulating said sleeve in an electrical insulating material to form a semifinished commutator body, machining a plurality of circumferentially spaced and axially extending slots in said semifinished commutator body so that each slot extends from the other axial end of said sleeve to the space between adjacent tangs at said one of said sleeve and so that said slot extends entirely through said strip of conductive material to thereby form a plurality of circumferentially spaced and electrically insulated commutator segments, the improvement which comprises:

means for reinforcing said tangs against deflection during rotation of the commutator, said reinforcing means comprising a plurality of radially inwardly recessed portions of said conductive strip, one recessed portion being provided in each space between each pair of adjacent tangs, each recessed portion having an outer axial end and an inner axial end, said outer axial end of each recessed portion being positioned between the inner end of the recessed portion and an outer end of the tang adjacent the recessed portion, said inner end of the recessed portion being positioned adjacent an inner end of its adjacent tang, said outer end of the recessed portion being joined to said tang and wherein the inner axial end of each recessed portion is radially recessed with respect to the inner end of its adjacent tang, said encapsulating material covering and encapsulating said recessed portions thereby reinforcing said tangs against deflection during rotation of the commutator.

2. The invention as defined in claim 1 and comprising a pair of recessed portions in each space between adjacent tangs, said recessed portions in each space extending generally axially with respect to said sleeve and being circumferentially spaced from each other.

3. The invention as defined in claim 1 wherein said sleeve is made of copper.

4. The invention as defined in claim 2 wherein said slot extends to a midpoint between said recessed portions so that said encapsulating material forms a dam at the end of each slot adjacent the tangs.

* * * * *